US008095306B2

(12) United States Patent
Villalobos et al.

(10) Patent No.: US 8,095,306 B2
(45) Date of Patent: Jan. 10, 2012

(54) GUI INTERFACE FOR A ROAD MAINTENANCE MANAGEMENT CONTROL SYSTEM

(75) Inventors: Oscar Ernesto Villalobos, Melbourne (AU); Stuart Gillon Wheeler, Pascoe Vale South (AU)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/070,867

(22) Filed: Mar. 24, 2011

(65) Prior Publication Data

US 2011/0173039 A1 Jul. 14, 2011

Related U.S. Application Data

(62) Division of application No. 11/730,368, filed on Mar. 30, 2007, now Pat. No. 7,945,385.

(51) Int. Cl.
*G01C 21/30* (2006.01)
(52) U.S. Cl. ...................................... 701/208
(58) Field of Classification Search .......... 701/207–208, 701/211; 345/156–157, 661, 676; 340/990, 340/995.1, 995.11, 995.14, 995.16, 995.19, 340/995.26; 715/716, 754, 771, 781, 855–857
See application file for complete search history.

(56) References Cited

U.S. PATENT DOCUMENTS

| 5,526,266 A | 6/1996 | Rutan et al. |
| 5,531,122 A | 7/1996 | Chatham et al. |
| 5,737,215 A | 4/1998 | Schricker et al. |
| 5,808,907 A | 9/1998 | Shetty et al. |
| 5,817,936 A | 10/1998 | Schricker |
| 5,848,371 A | 12/1998 | Creger |
| 5,961,560 A | 10/1999 | Kemner |
| 6,343,237 B1 | 1/2002 | Rossow et al. |
| 6,721,680 B2 | 4/2004 | Sorrells et al. |
| 6,757,604 B2 | 6/2004 | Carlson et al. |
| 6,839,638 B2 | 1/2005 | Lueschow et al. |
| 6,842,680 B2 | 1/2005 | Doddek et al. |
| 6,858,809 B2 | 2/2005 | Bender |
| 2003/0182052 A1* | 9/2003 | DeLorme et al. ............. 701/201 |
| 2004/0122576 A1 | 6/2004 | Sorrells et al. |
| 2004/0122618 A1 | 6/2004 | Suzuki et al. |
| 2005/0145018 A1 | 7/2005 | Sabata et al. |
| 2006/0155447 A1 | 7/2006 | Uken et al. |
| 2007/0038962 A1* | 2/2007 | Fuchs et al. ................... 715/855 |
| 2007/0078570 A1 | 4/2007 | Dai et al. |

(Continued)

OTHER PUBLICATIONS

Roger J. Thompson and Alex T. Visser, "Management of Unpaved Road Networks on Opencast Mines," Transportation Research Record (TRR) 1652, vol. 2, Transportation Research Board, National Academy Press, Washington, D.C., USA, 1999, pp. 217-224.

(Continued)

*Primary Examiner* — Kim T Nguyen
(74) *Attorney, Agent, or Firm* — Finnegan, Henderson, Farabow, Garrett & Dunner LLP (57) ABSTRACT

A display device for displaying a graphical user interface is disclosed. The graphical user interface includes a first window configured to display a road maintenance map of a mine road network, and one or more links configured to access a second window. The second window is configured to facilitate selection of one or more data files containing data associated with the mine road network. The graphical user interface also includes one or more links configured to access a third window. The third window is configured to access to one or more analysis tools configured to analyze the data.

20 Claims, 8 Drawing Sheets

U.S. PATENT DOCUMENTS

2007/0112475 A1   5/2007   Koebler et al.
2008/0082347 A1   4/2008   Villalobos et al.
2010/0073813 A1   3/2010   Dai et al.

OTHER PUBLICATIONS

R. J. Thompson and A. T. Visser, "A mechanistic structural design procedure for surface mine haul roads," International Journal of Surface Mining, Reclamation and Environment 11 (1997): 121-128.

R. J. Thompson, and A. T. Visser, "The functional design of surface mine haul roads," The Journal of South African Institute of Mining and Metallurgy, vol. 100, No. 3, May/Jun. 2000, pp. 169-180.

R. J. Thompson and A. T. Visser, "Towards a mechanistic structural design method for surface mine haul roads," Journal of South African Institute of Civil Engineering, 1996, vol. 38, No. 2, pp. 13-21.

Roger J. Thompson and Alex T. Visser, "An integrated Haul Road Design System to Reduce Cost per Tonne Hauled," World Mining Equipment Haulage 2002 Conference, May 19-22, 2002, Tucson, Arizona, U.S.A., pp. 1-14.

R. J. Thompson and A. T. Visser, "An introduction to the integrated design of surface mine haul roads," International Journal of Surface Mining, Reclamation and Environment, 11 (1997): 115-120.

Cannon, "System and Method of Monitoring Machine Performance," U.S. Appl. No. 11/092,612, filed Mar. 30, 2005 (22 pages).

"Haul Road Maintenance Management System," U.S. Appl. No. 11/529,515, filed Sep. 29, 2006 (23 pages).

* cited by examiner

GUI INTERFACE FOR A ROAD MAINTENANCE MANAGEMENT CONTROL SYSTEM

This application is a divisional of prior application Ser. No. 11/730,368, filed Mar. 30 2007, now U.S. Pat. No. 7,945,385 which is incorporated herein by reference.

TECHNICAL FIELD

The present disclosure relates generally to a GUI interface and, more particularly, to a GUI interface for a road maintenance management control system.

BACKGROUND

Many commercial operations require a fleet of vehicles to transport material. For increased profitability of the operation, the fleet of vehicles must be well maintained. Among other things, maintenance of these vehicles is affected by the quality of the roads over which they travel. Poor maintenance of the roads, while saving road maintenance costs, may increase vehicle maintenance costs (vehicle down time, cost of repair, etc.) by negatively affecting the quality of the roads. On the other hand, over maintenance of the roads may result in money and effort spent unnecessarily. In general, efficiency of a commercial operation that uses a fleet of vehicles may be improved by scheduling road maintenance with a view to minimize total costs.

One commercial operation where a fleet of trucks is used to transport material includes mining. In a typical mine site, a fleet of haul trucks transport excavated material (ore, supplies, etc.) over mine roads. Efficient operation and profitability of the mine are affected by the quality of the mine roads. For example, the grade and quality of the mine roads affect the size of the payload that can be transported over a section of the mine road, transportation time, vehicle health, fuel usage, etc. Traditionally, maintenance of the mine roads have been highly reactive. That is, mine road defects are repaired as they occur, with'little planning or scheduling. This ad-hoc maintenance approach is inefficient and increases costs by over or under maintenance of the mine roads.

One approach at improving road conditions is disclosed in U.S. Pat. No. 5,817,936 issued to Schricker (the '936 patent) on Oct. 6, 1998. In particular, the '936 patent discloses detecting an abnormal road surface condition by sensing machine parameters as a mobile machine traverses a segment of the road. These parameters are then used to calculate a resistance factor for the road segment. The calculated resistance factor is compared with an average resistance factor, and an abnormal condition of the road surface can thus be detected. If an abnormal condition is detected, the road is repaired to correct the condition.

Although the method of the '936 patent may sufficiently detect an abnormal surface condition of the road, it does not provide an intuitive graphical user interface that facilitates analysis of the collected data and development of an optimized road maintenance approach. Instead, the method disclosed in the '936 patent is limited to detection of road damage only, followed by routine reactive repair when resources become available.

The present disclosure is directed to overcoming one or more of the problems set forth above.

SUMMARY OF THE INVENTION

In one aspect, a display device configured to display a graphical user interface for a road maintenance management system is disclosed. The graphical user interface includes a first window configured to display a road maintenance map including a selected road. The first window is also configured to graphically represent data associated with the selected road. The graphical user interface also includes a cursor configured to move over the graphical representation of data and a pointer configured to identify an area of the selected road corresponding to a current location of the cursor on the graphical representation.

In another aspect, a display device for displaying a graphical user interface is disclosed. The graphical user interface includes a first window configured to display a road maintenance map of a mine road network, and one or more links configured to access a second window. The second window is configured to facilitate selection of one or more data files containing data associated with the mine road network. The graphical user interface also includes one or more links configured to access a third window. The third window is configured to access to one or more analysis tools configured to analyze the data.

In yet another aspect, a mine road maintenance management system which includes a control system is disclosed. The control system is configured to receive data related to the mine road. The data includes one of performance data associated with a vehicle traveling on the mine road, and road condition data associated with quality of the mine road. The control system includes a storage device configured to store the data, and a display device configured to display a graphical user interface. The graphical user interface includes a first window. The first window is configured to include a graph of the data, and a map of the mine road including a selected road. The graph displays a variation of the data along the selected road. The graphical user interface also includes a cursor configured to move over the graph and a pointer configured to identify an area of the selected road corresponding to a current location of the cursor on the graph.

DETAILED DESCRIPTION

Figure 1:
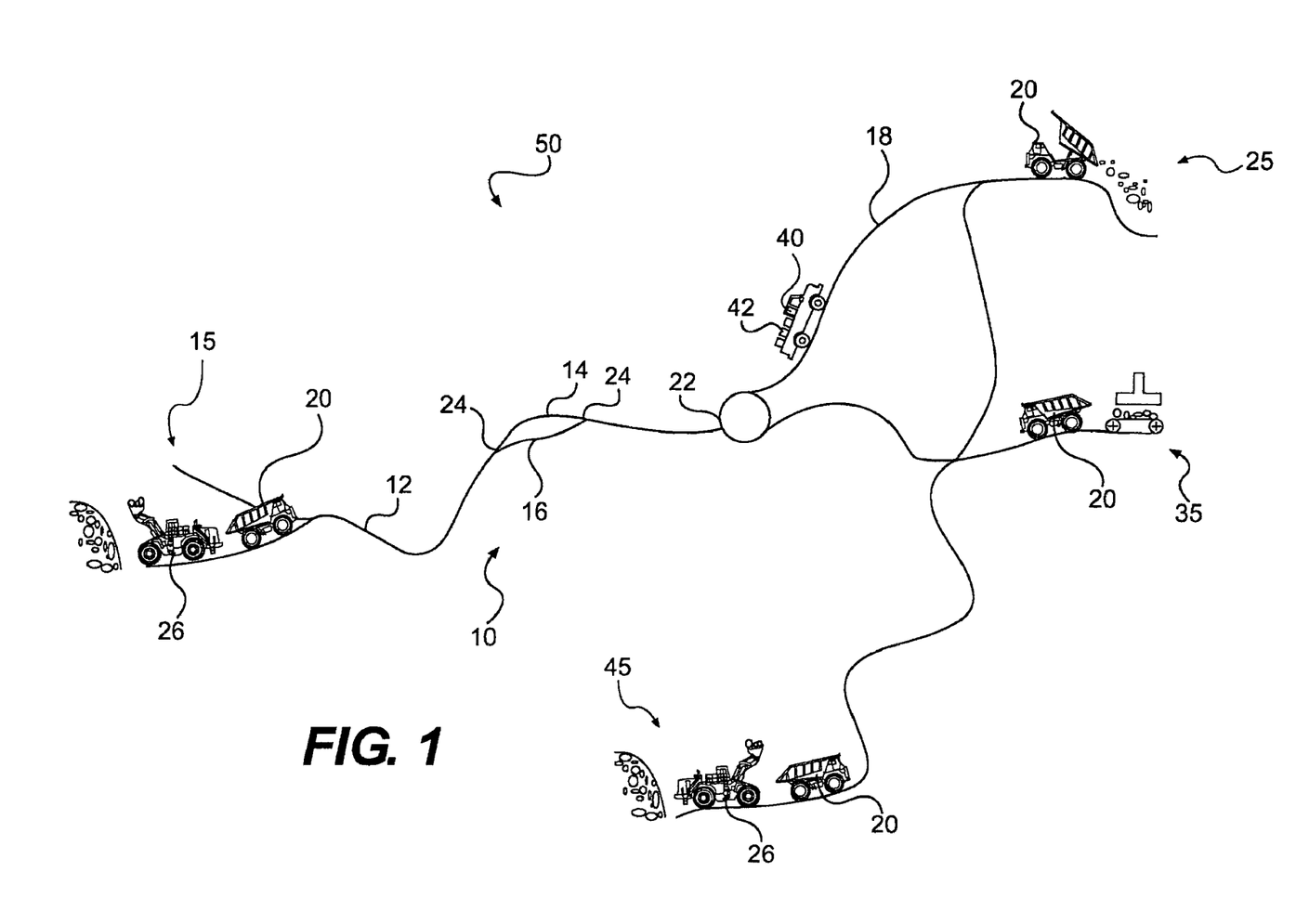
FIG. 1 is a diagrammatic representation of an exemplary disclosed open pit mine.

FIG. 1 shows an open pit mine 50. The mine 50 may include multiple areas of operation. These areas of operation may include an excavation site 15, an ore processing site 35 and a dump site 25. In some cases, multiple excavation sites, ore processing sites and dump sites may be present in a mine. For instance, a second excavation site 45 may be present. These areas of operation may be connected together by a network of roads. Collectively, this network of roads is referred to as the mine road 10. Mine road 10 may include multiple road segments 12, 14, 16, and 18. These road segments may be inclined, declined, substantially level, or any combination of these orientations. In some embodiments, the mine road 10 may also include intersections such as a Y-intersection 24, and a T intersection 22. These intersections may connect multiple road segments together. For instance, in the embodiment of the mine road 10 depicted in FIG. 1, Y-intersection 24 interconnects road segments 14 and 16 of the mine road 10. As part of the mining function, vehicles or other machines may traverse the mine road 10 between different areas of operation. These vehicles may include loading machines 26, service trucks 40, and haul trucks 20.

The loading machine 26 may be any machine capable of loading excavated materials from the mine onto haul trucks 20. Examples of a loading machine 26 may include a wheel loader, a front shovel, an excavator, an electric cable shovel or any other similar machine. The excavated materials may include ore or overburden. One or more loading machines 26 may operate within the excavation sites 15 and 45 to load excavated materials on the haul trucks 20.

The service truck 40, such as an on-highway pickup truck or equipment monitoring van, may carry personnel and/or road monitoring equipment over the mine road 10. These service trucks 40 may monitor and/or measure a road condition while traversing the mine road 10. This road condition may include visually observed conditions, physically felt conditions, and measured conditions. Visually observed conditions may include road defects such as pot holes, sink holes, etc. Physically felt conditions may include conditions felt by the operator, such as road surface corrugation, road roughness, etc. Measured conditions may include conditions monitored by sensors. Non-limiting examples of these sensors could include high speed profilometers that measure the road roughness, density sensors that measure the density of the road, cameras that take a photograph of the observed defects, etc. The service trucks 40 may also be configured to record and/or communicate the road condition.

The haul truck 20 may include any vehicle that carries excavated materials between different areas of operation in the open pit mine 50. Examples of a haul truck 20 may include an articulated truck, an off-highway truck, an on-highway dump truck, a wheel tractor scraper or any other similar vehicle. Laden haul trucks 20 may carry ore or overburden (referred to as payload) from excavation sites 15 and 45 to the dump site 25, or to the processing site 35 along mine road 10. Empty haul trucks 20 may return to the excavation sites 12, 14 along either of these routes.

The haul truck 20 may also include sensors and record and/or transmit data while traversing the mine road 10. This data may include data automatically monitored by sensors in the vehicle (monitored data), and data observed by the vehicle operators (observed data). The monitored data may include vehicle parameter data and road parameter data. The vehicle parameter data may include, among others, torque at various points along the vehicle's drive-train, rolling resistance of the vehicle's tires, payload weight, operator gear selection along the haul route, vehicle speed, suspension cylinder pressures, etc. The suspension cylinder pressures may include the pressure of a front left suspension (FL), a front right suspension (FR), a rear left suspension (RL), and a rear right suspension (RR). Road parameter data may include, among others, the grade of the road, and the coordinate location of the haul truck 20 at a given time. In some embodiments, the road parameter data may also include road condition data similar to those measured by the service truck 40.

The observed data may include information associated with the physical condition of the mine road 10. In some embodiments, data observed by the haul truck operators may supplement the data observed by the service truck operators. The observed data may include information regarding a defect in a road segment, such as the type of defect (pot holes, road surface corrugation, rutting, loose material, excessive dustiness, surface cracks, etc.), criticality of the defect, location of the defect, and any special circumstances that increase or decrease the impact of the defect on the haul truck 20. The criticality of the defect may include an indication of the severity of the defect measured on a relative scale. For instance, the severity of a pot hole defect may be scaled from "1" to "5", with "5" referring to a deep pot hole that may cause immediate damage to a haul truck 20, and "1" referring to a pothole that is a mere inconvenience. In some cases, the same relative scale may be used by substantially all the vehicle operators recording data on the physical condition of the mine road 10. The data observed by the vehicle operator may be recorded electronically (data logger, etc.) or manually (log book, etc.). It is also contemplated that in some cases, an operator may transmit information on an observed defect immediately.

The haul truck 20 may also include means for calculating quantities based on the monitored data and/or the observed data (computed data). Some of these quantities may indicate the response of the haul truck 20 to the road condition and be computed as any mathematical function of some (or all) of the monitored and/or observed data. For example, machine bias, machine pitch, and machine rack may be computed using the monitored suspension cylinder pressures—FL, FR, RL, and RR. Machine bias may indicate the angle or level at which the vehicle is positioned and to which side the load is positioned. Machine bias may also indicate high dynamic loading due to "off-camber" corners. Machine pitch may indicate if the vehicle is weighted toward the front or to the rear. Machine rack may indicate that a chassis of the haul truck 20 is twisting when the diagonally opposite cylinders are traveling in opposite directions.

The haul truck 20 may also have a recording and/or a communicating module (not shown) for recording and electronically transferring the monitored and observed vehicle and road condition data. The recording module could include any data storing means known in the art. In some embodiments, the data storing means may include a permanent data recorder or a portable recording medium used to transfer the recorded data from the haul truck 20 to another site. The communication module may include any device known in the art that facilitates data and/or voice communication between the haul truck 20 and another site. In some instances, the communication module may include hardware and/or software that enables wireless transfer of data from the haul truck 20 to another site. It is contemplated that in some situations, the data may be transferred from the haul truck 20 through a data transfer link. It is also contemplated that in some situations, multiple communication methods may be used to transfer the data from the haul truck 20 to another site. For instance, the monitored data may be electronically transferred, while transfer of the observed data may be accomplished using a radio.

Figure 2:
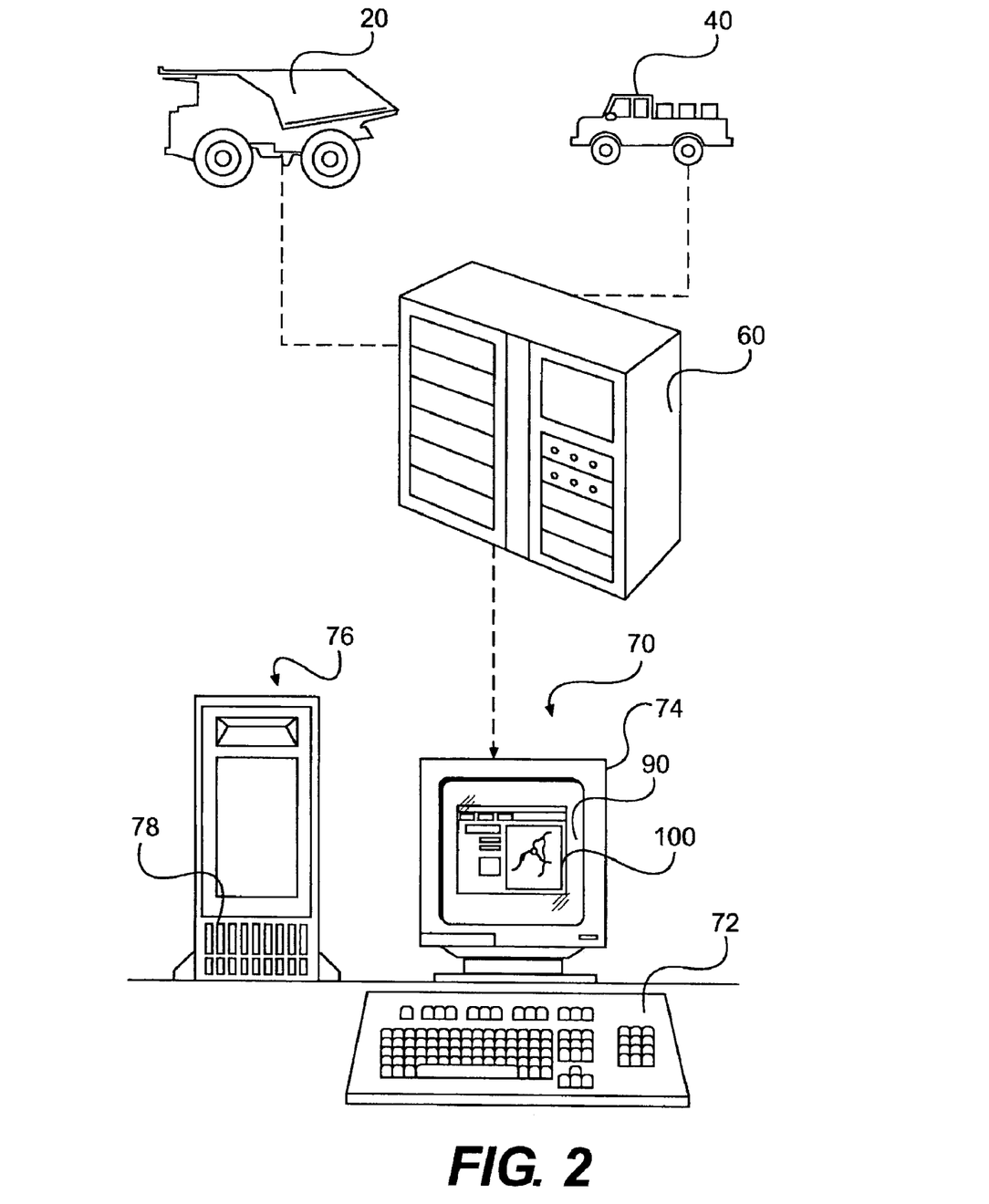
FIG. 2 is a schematic illustration of an exemplary control system with a display device for road maintenance management at the open pit mine of FIG. 1.

The monitored, observed, and computed data from multiple haul trucks 20 and service trucks 40 traversing the mine road 10 may be transferred to a data repository 60 (shown in FIG. 2). The data repository 60 may include (among other components) any type of data storage means. In some embodiments, the data repository 60 may include a data server, a computer, or a plurality of computers networked together. The data repository 60 may be located proximate the mine 50 or may be located at a considerable distance remote from the mine 50, such as in a different city or even a different country. It is also contemplated that computers at different locations may be networked together to form the data repository 60. The data repository 60 may include communication means to transfer data into and out of the data repository 60. The communication of data to and from the data depository 60 may be continuous or periodic, and may be accomplished by any means known in the art. For instance, the data transmission may be accomplished using the world wide web, a wireless communication system, a wired connection, or by transferring a recording medium (flash memory, floppy disk, etc.) between the haul trucks 20, service trucks 40 and the data repository 60.

The data repository 60 may compile the data from multiple haul trucks 20 and service trucks 40. In some embodiments, the data repository may store the received data with additional data generated by the data repository 60. This additional data may include, among others, information that identifies the source of the data (vehicle identification number, operator name and/or identification number, etc.) and the time the data was received. In some embodiments, the computation of computed data (for example, machine bias, machine pitch, and machine rack) may be performed by the data repository 60 instead of, or in addition to, the haul vehicles 20. The data repository may transfer data to a control system 70 which may process the data and perform maintenance management of the mine road 10.

FIG. 2 illustrates an exemplary control system 70. Control system 70 may include, among others, an input module 72, an output module 74, and a computing platform 76. Although the control system 70 is depicted as a personal computer (PC) in the embodiment of FIG. 2, the control system 70 may be any type of device that is capable of receiving data from the data repository 60 and performing road maintenance management. For instance, the control system 70 may include a lap top computer, a PDA (personal digital assistant) or other hand held computing device, a server, a network of computers, etc. The control system 70 may be located proximate the mine 50 or may be located at a considerable distance remote from the mine 50. In some embodiments, the data repository 60 may be located at a central site to collect data from several mine operations, and control systems 70 may be located at the different mine operations to perform main road maintenance management. It is contemplated that, in some embodiments, the control system 70 may perform the functions of both the data repository 70 and the control system 70. In these embodiments, a separate data repository 70 may be eliminated.

Transfer of data from the data repository 60 to the control system 70 may be accomplished by any means known in the art. For instance, the data transfer may be accomplished by a wireless communication system, a wired connection, or by transferring a recording medium (flash memory, floppy disk, etc.) between the data repository 60 and the control system 70. It is also contemplated that data transfer means may include any suitable combination of wired and/or wireless components and systems. In some embodiments, the transfer of data may be achieved through the use of a network architecture. The network architecture may include, alone or in any suitable combination, a telephone-based network (such as a PBX or POTS), a local area network (LAN), a wide area network (WAN), a dedicated intranet, and/or the interne.

Input module 72 of the control system 70 may include a wide variety of devices configured to input data into the control system 70. For example, input device 72 may include a keyboard, mouse, joy-stick, touch-screen, disk drive, video camera, magnetic card reader, scanner, a CD drive, a DVD drive, a floppy disk drive, a memory stick input, or any other suitable device.

Computing platform 76 of the control system 70 may include (or may otherwise be operatively coupled to) software to implement road maintenance management. The computing platform 76 may include a memory 78 having one or more databases. One or more of these databases may store the data transferred from the data repository 60. The database may also store results of computations performed by the computing platform 76, the haul truck 20 or the data repository 60. Memory 78 may also store one or more maps of the mine road 10. These maps may be input using an input module 72, for example, by scanning, or digitizing by another means. It is contemplated that maps of different sections of the mine road 10 may be stored in the memory 78. It is also contemplated that, in some embodiments, the maps stored in the memory 78 may include maps of a single mine road section at different magnifications. Computing platform 76 may also include a wide variety of components or subsystems such as, processors, cache memory, memory controller, graphics controllers, network adapters, data processing devices, etc. In addition to performing logic, mathematical and other operations on the data, the computing platform 76 may communicate or transfer data to and from the input module 72 and the output module 74.

The output module 74 may output data to a user. Output module 74 may include any device capable of outputting data to a user. Non-limiting examples of these devices may include a printer, a plotter and a display device 90. The display device 90 may output the data stored in the database and data that is received from a haul truck 20 or the data depository 60 to the user. This data may be displayed using a textual format, a tabular format, a graphical format, a pictorial format, or using any combination of these formats. Pictorial format may include images (such as, photographs, sketches, etc.) of defects and representations of the mine road (maps, pictures, etc.). Graphical format may include graphs (line graphs, bar graphs, pie graphs, etc.), and other visual representations of data. Tabular format may include listing of data in a tabular form. Textual format may include a listing of data.

The display device 90 may include any device capable of visual or tactile presentation of data and images in a form intelligible to a user. In some embodiments, the display device 90 may present information dynamically in a visual medium. In some other embodiments, the display device 90 may support a tactile display (display that may be felt by the fingers—and intended for the visually impaired) of data and images. Non-limiting examples of the display device 90 may include a cathode ray tube, a liquid crystal display, a light emitting display, a plasma display, etc. In some embodiments, the display device 90 may also accept input. In these embodiments, the display device 90 may include a touch screen where information may be entered by selecting one of multiple options presented on the display. Selecting an option may be accomplished using a mouse (as is well known in the art), or touching an area of the display.

The display device 90 may be provided with a graphical user interface (GUI) 100. The GUI 100 may provide visual feedback to a user regarding a condition of the mine road 10. The GUI 100 may display at least some of the data (from among monitored, observed, and computed data) associated with the mine road 10. The GUI 100 may also include multiple overlapping windows accessible to each other. As will be described in FIGS. 3-8, the overlapping windows may include, among others, a first window 110, a second window 130, a third window 150, a fourth window 170, a fifth window 190, and a sixth window 210. In some embodiments, the GUI 100 may also include an initial access window where a user may be asked to input identification information before being allowed access to other windows of the GUI 100. Although the identification information may be of any form, in some embodiments, the identifying information may include a user name and a password. It is also contemplated that, in some embodiments, the user may be required to accept a license agreement before being allowed access to the windows of the GUI 100. Accepting the agreement may be accomplished by moving a cursor on the display device 90 using a mouse (or other input device 72), and selecting an identified region of the GUI 100.

The overlapping windows of the GUI 100 may resemble multiple pages of a book, wherein each page represents a window. Some of these windows may display data while other windows may query the user for input. Some (or all) of these windows may include tabs and/or buttons. Selecting a tab may allow a user to access the window associated with the selected tab and selecting a button may allow the user to select an input within the window. In some instances, selecting a button may select an input, close a window, and return to the user to another window.

In some embodiments, the overlapping windows may be functionally classified into three groups. The first group may encompass windows that enable the user to create and define a maintenance project. The second group may encompass windows that enable the user to perform road and vehicle related data analysis, and the third group may encompass windows that report an analysis of the road and vehicle related data. In some embodiments, one or more windows may be part of multiple groups. In general, the first, second, third, fourth, fifth, and sixth windows 110, 130, 150, 170, 190, and 210 can be part of any of the first, second or the third groups. However, in the description that follows, the first, second, third and fourth window 110, 130, 150, and 170 will be described as part of the first group, and the fifth and the sixth window 190, 210 will be described as part of the second group. The windows of the third group, which are not illustrated herein, may include windows that inform a user of a condition of a road, or a vehicle on the road. These windows may include a mine severity map that gives a user an indication of the severity of the condition of different roads in a mine.

Figure 3:
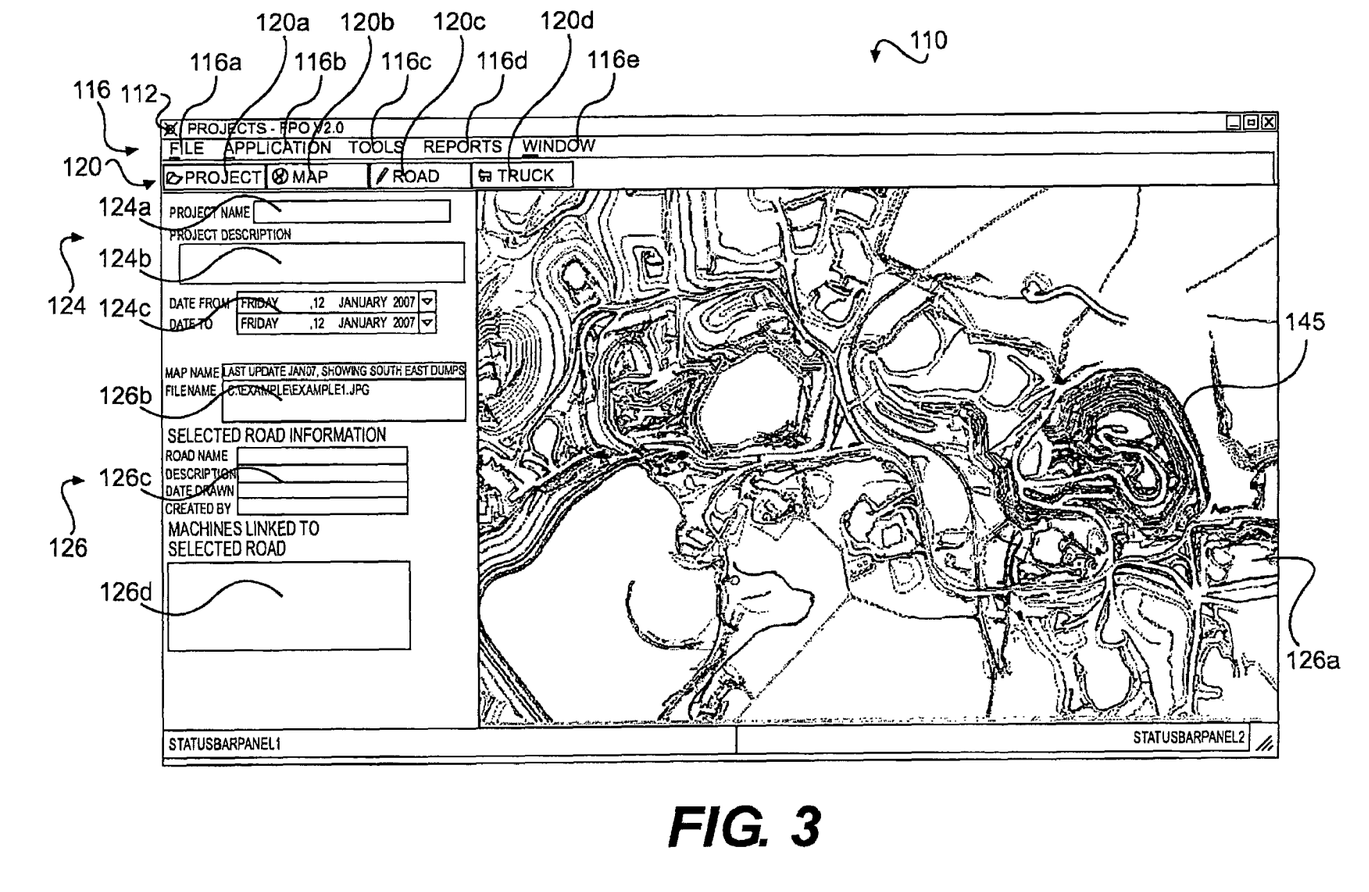
FIG. 3 is a schematic illustration of an exemplary first window of a GUI for use with the display device of FIG. 2.

FIG. 3 illustrates an exemplary first window 110 of the GUI 100. The first window 110 may enable the user to define a road maintenance project. The first window 110 may include a project name region 112, a button region 116, a tab region 120, a text entry region 124 and information display region 126. The first project name region 112 may include text and/or graphics identifying the name of the project.

The button region 116 may include one or more buttons 116a-e that allow the user to perform many functions. Selecting some of these buttons may open a window having more buttons. For instance, the button region 116 may include button 116a that may allow a user to perform many general functions. Selecting button 116a may open another window allowing the user to perform various functions, such as, open a project, save a project, print an output from the GUI 100, etc. Selecting button 116b may allow a user to define macros to perform specific functions. For instance, button 116b may enable the user to write a program to perform a desired operation on the road and vehicle data. Button 116c may allow the user access to the second group of windows. That is, button 116c may allow a user to select from different data analysis options. For instance, button 116c may allow a user to plot a graph of a road related data to help a user understand the deterioration of a road over time. Button 116d may allow a user access to the third groups of windows. For instance, button 116d may allow the user access to the group of windows that report the analyzed data. The button region 116 may also include button 116e that allows the user to set system parameters, such as a size of the GUI 100, a font type and size of displayed text, buttons to access other active applications, etc. It is contemplated that, in some embodiments, some of buttons 116a-e may be omitted. It is also contemplated that, in some embodiments, the button region 116 may include other buttons. For instance, buttons that enable the user to access a help function may be included within button region 116. The help function may provide access to information that helps the user to use the maintenance management system.

The tab region 120 may include one or more tabs 120a-d that enable a user to access another window within the same group. In the embodiment of the first window 110 depicted in FIG. 3, the tabs region 120 may include a "Project" tab 120a, a "Map" tab 120b, a "Road" tab 120c, and a "Truck" tab 120d. It must be emphasized that other embodiments may include tabs different from (or in addition to) the tabs displayed in FIG. 3. The "Project" tab 120a may allow the user to select from previously stored projects, the "Map" tab 120b may allow the user to input and view information relating to the mine road being analyzed, the "Road" tab 120c may allow a user to select a particular road within the mine road 10 for analysis, and the "Truck" tab 120d may allow the user to select a data set from the database for analysis.

The text entry region 124 may include multiple text entry boxes 124a-c where the user can input information. For instance, the user may input a project name in text entry box 124a, and project description in text entry box 124b. In some embodiments, the text entered in text entry box 124a may be displayed in the project name region 112 of the GUI 100. The project description input in text entry box 124b may include a short description of the project that may help a user identify the project. Text entry box 124c may allow the user to input a desired time period for the analysis. In some embodiments, text entry box 124c may have multiple text entry regions. For instance, text entry regions for inputting the starting date and the ending date of the period, the starting date and the time span, etc may be included within text entry region 124. In some embodiments, the text entry region 124 may also include boxes that allow users to input other information.

The information display region 126 may include an information display area 126a where the GUI 100 displays data. The displayed data may include data stored in the database of the computing platform 76, the data repository 60, or data input into the control system 70 using the input module 72. As described earlier, this data may be displayed in any format. In some embodiments, the display in the information display area 126a may be adjusted by the user for better visibility. For instance, the map of the mine road 10 (displayed in the information display area 126a of the embodiment shown in FIG. 3), may be rotated, panned and zoomed by a user. In some embodiments, information relating to the map displayed in information display area 126a may be displayed in information display areas 126b and 126c. Information display area 126b may display the location of the map stored in the database, and information display area 126c may include a description of the map. Information display region 126 may also include information display area 126d that displays details of the road and/or vehicle data being analyzed.

Figure 4:
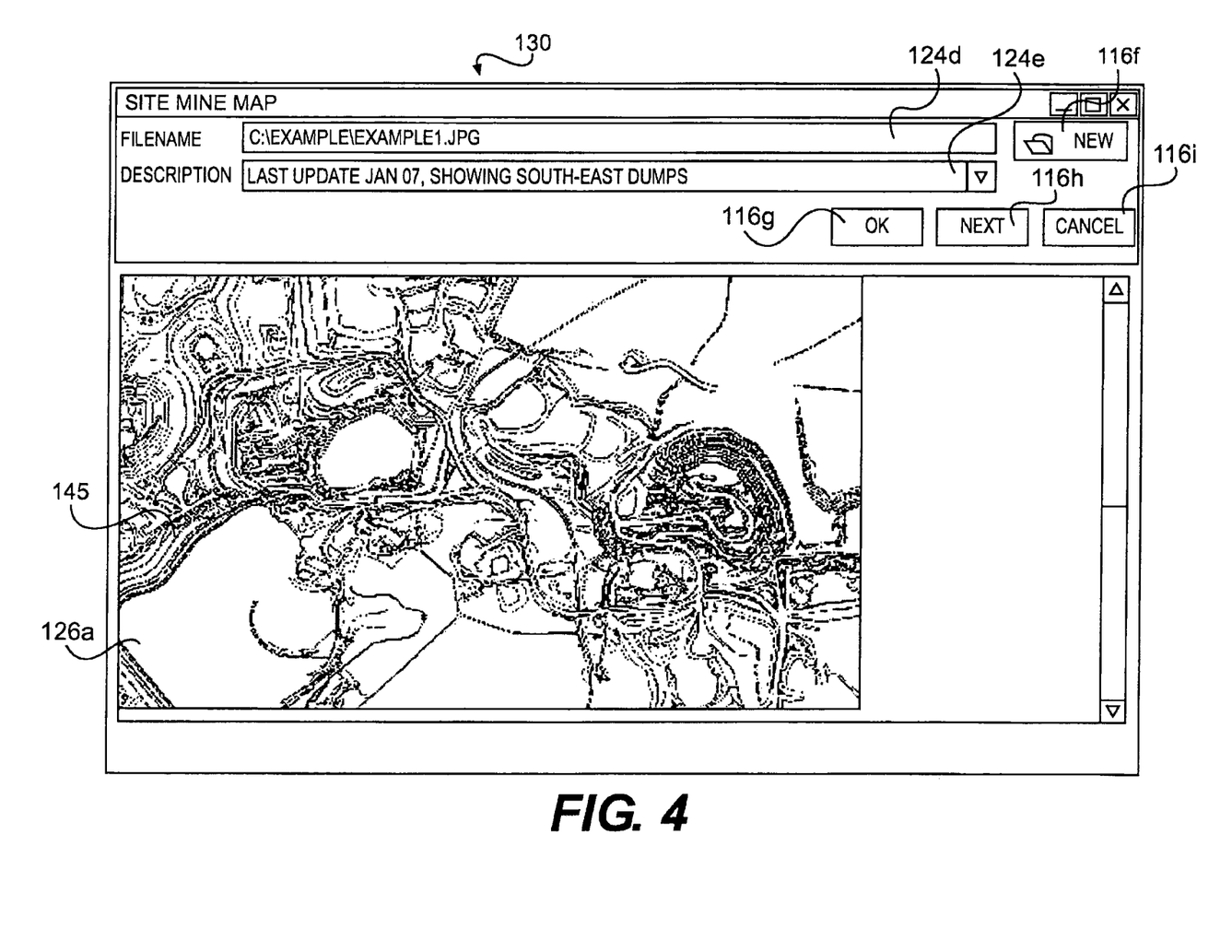
FIG. 4 is a schematic illustration of an exemplary second window of the GUI for use with the display device of FIG. 2.

As described earlier, a user may access other windows within the same group by clicking a tab in the tab region 120. Clicking on the "Map" tab 120b may open a second window 130. FIG. 4 shows an exemplary second window 130. The second window 130 may be used to input a map of the mine road 10 for maintenance management purposes. This map, referred to as a mine road maintenance map 145, may be selected from a plurality of maps stored in the memory 78 or the data repository 70. In some embodiments, an image of a mine road may be scanned in and used as the mine road maintenance map 145. In some embodiments, the mine road maintenance map 145 may include hyperlinks that attach additional data to selected roads of the map. In these embodiments, clicking on the selected roads may open one or more windows containing data associated with the selected road.

The second window 130 may include text entry boxes 124d-e. In some embodiments, text entry box 124d may be used to enter the path of a stored map. Information relating to the stored map may be displayed in text entry box 124e. In some embodiments, a mine road maintenance map 145 may be selected from multiple stored maps by scrolling through a list of stored files and selecting a desired map from the list. Second window 130 may also include buttons 116f-i that may enable a user to make various selections. For instance, clicking a "New" button 116f may allow a user to choose another mine road maintenance map 145 for analysis, while clicking an "OK" button 116g may select the chosen map, close the second window 130 and display the first window 110. Clicking a "Next" button 116h may select the chosen map, close the window and open another window, and clicking a "Cancel" button 116i may disregard the chosen mine road maintenance map 145 and allow the user to select a different desired map. The second window 130 may also include an information display area 126a. The information display area 126a may display the mine road maintenance map 145 selected by the user.

Figure 5:
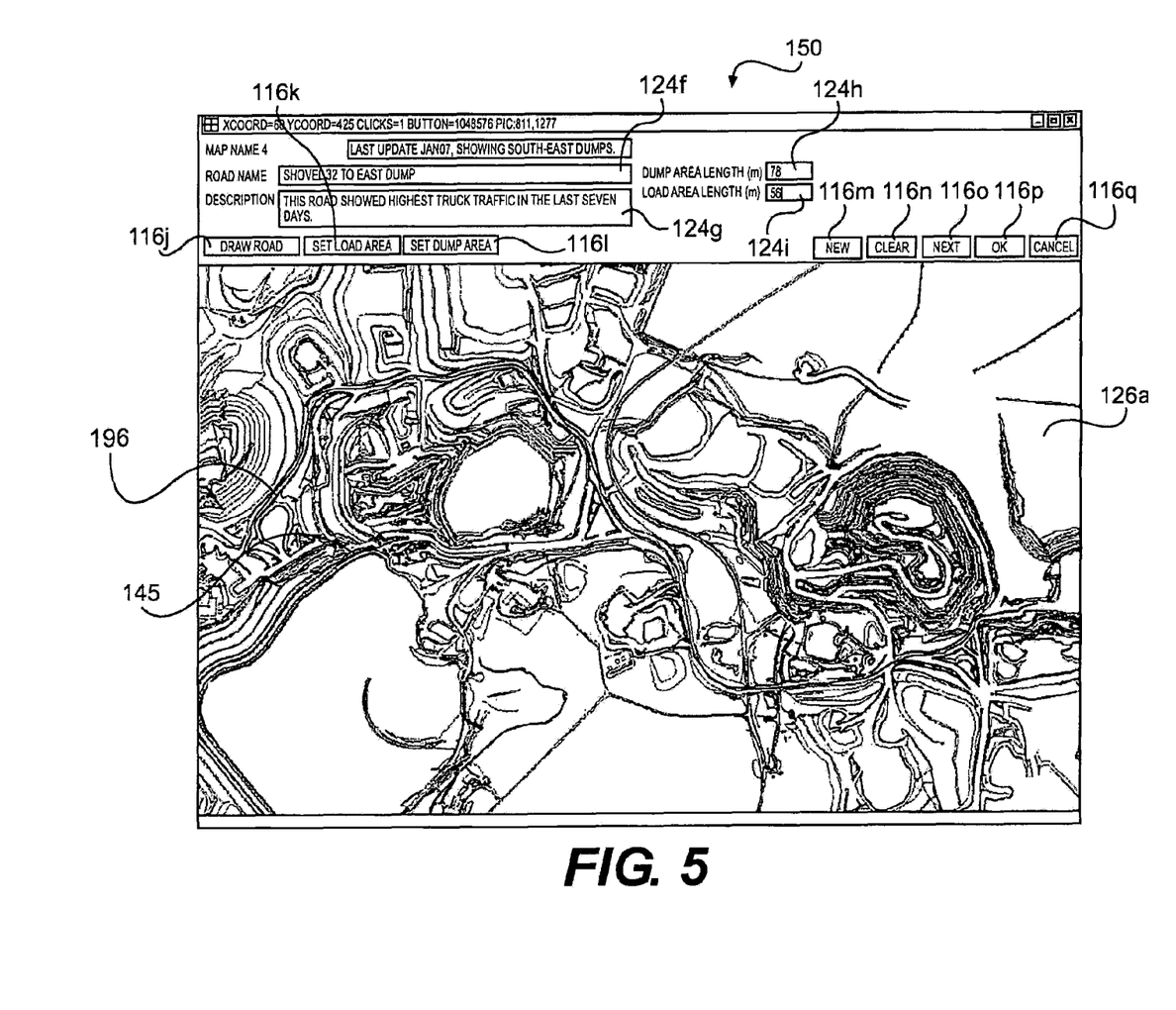
FIG. 5 is a schematic illustration of an exemplary third window of the GUI for use with the display device of FIG. 2.

After a mine road maintenance map 145 is selected in the second window 130, a selected road 196 on that map may be chosen for maintenance analysis. Clicking the "Road" tab 120c on the first window 110 may open a third window 150. Alternatively, the user may click the "Next" button 116h of the second window 130 to access the third window 150. The third window 150 may enable a user to choose the selected road 196 for analysis. FIG. 5 shows an exemplary third window 150. The third window 150 may also include multiple buttons 116j-q, text entry boxes 124f-i, and information display area 126a. Some of the buttons 116j-q and the text entry boxes 124f-i may enable a user to choose the selected road 196 for analysis. In some embodiments, a selected road 196 may be chosen from a plurality of roads saved in the data base. In these embodiments, the user may scroll through multiple stored roads and choose a desired selected road 196 from a list. It is also contemplated that a user may choose multiple selected roads for analysis. The user may input information related to the selected road 196 in text entry box 124f-g. For instance, the user may name the selected road 196 in text entry box 124f and input a description of the selected road 196 in text entry box 124g.

In some embodiments, by clicking button 116j, the user may choose a selected road 196 by selecting multiple waypoints on the mine road maintenance map 145 displayed in information display area 126a. The selected road 196 may be defined as the line joining the selected waypoints. A linear, polynomial, or any other fitting algorithm may be used to define the road, joining the keypoints. It is contemplated that, in some embodiments, the user may choose the quality of the fit by specifying the order of the polynomial used to connect the waypoints. In these embodiments, appropriate text entry boxes may allow the user to select the order of the polynomial. It is also contemplated that in some embodiments, one or more keypoints selected by a user may be moved (translated in one or more directions) to correspond with known coordinate locations of a road. An area around the end points of the selected road 196 may be defined as a loading area and a dumping area using buttons 116k and 116l respectively. In some embodiments, the user may input the distance from the end points of the selected road 196 that defines a loading and a dumping area in text entry boxes 124h and 124i respectively.

While selecting waypoints to define the selected road 196, clicking the "New" button 116m may enable a user to disregard a waypoint selection and choose a new waypoint. Clicking the "Clear" button 116n may allow the user to disregard one or more selected waypoints. Clicking the "Next" button 116o may accept the waypoint selections and open another window. Clicking the "OK" button 116p may accept the selected waypoints and return the user to the first window 110, and clicking the "Cancel" button 116q may return the user to the first window 110 disregarding all the selections made in the third window 150.

Figure 6:
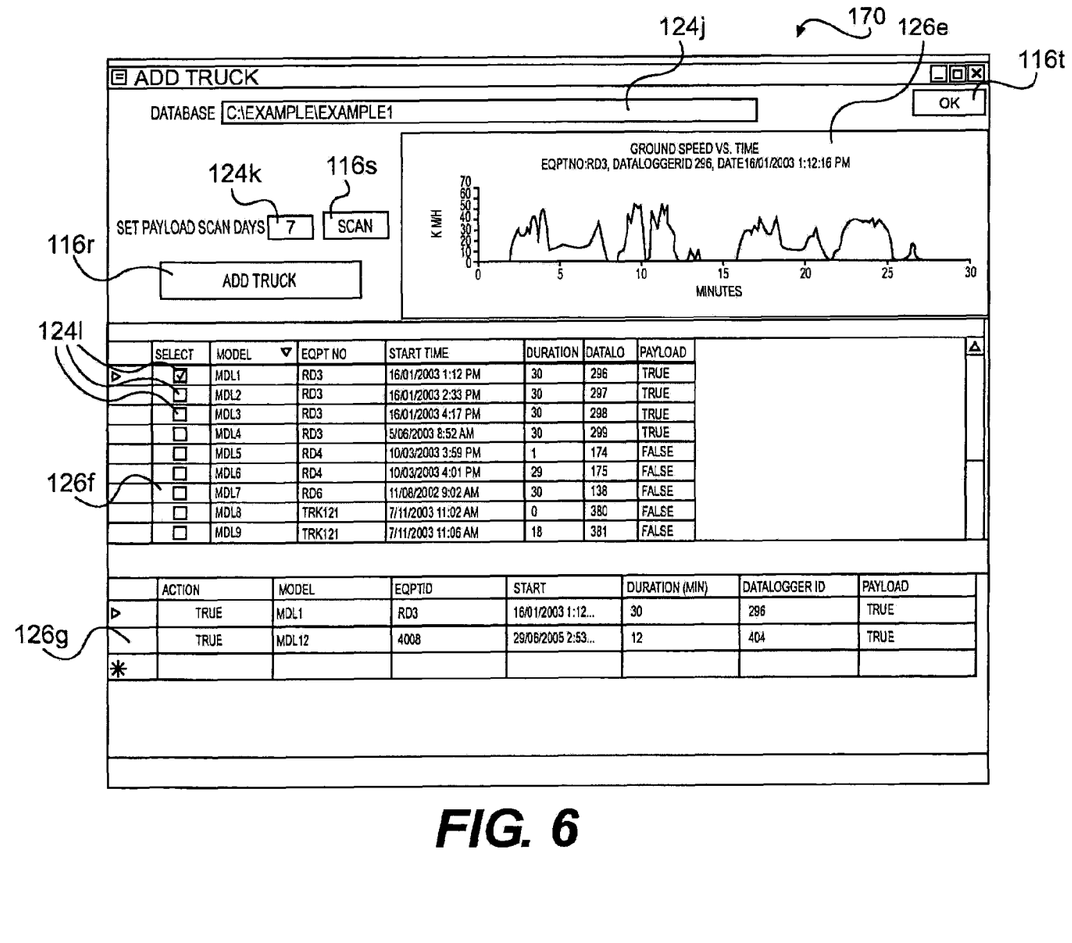
FIG. 6 is a schematic illustration of an exemplary fourth window of the GUI for use with the display device of FIG. 2.

After a selected road 196 is chosen in the third window 150, data may be associated with the selected road 196. Clicking the "Truck" tab 120d on the first window 110 may open a fourth window 170. FIG. 6 shows an exemplary fourth window 170. The fourth window 170 may enable the user to select data for analysis. The fourth window 170 may also include multiple buttons 116r-t, text entry boxes 124j-1, and information display areas 126e-g. The user may select a data file from the database by inputting the path to the data file in text entry box 124j. In some embodiments, the user may be able to scroll through and choose a data file from multiple files stored in the data base. In some embodiments, the user may search the database for data files that match a defined criteria. For instance, the user may search for data files that were stored in the data base in the past seven days by inputting "7" in text entry box 124k and clicking the "Scan" button 116s.

Information display area 126f may display all the data files satisfying the criteria defined in text entry box 124k. The information displayed in information display area 126f may include information related to the data file that enables the user to identify a desired data file. This information may include, among other, the vehicle that collected the data, the time of data collection, the duration of data collection, the presence or absence of payload while collecting the data, etc. The user may choose the desired data file by checking a text entry box 124l associated with the data. In some embodiments, selection of multiple data files may be permitted. After checking the desired data files, clicking the "Add Truck" button 116r may select the checked data files for analysis. These selected data files may be displayed in information display region 126g. In some embodiments, a part of all the display in information display region 126g may be includes in information display region 126d in the First window 110. In some embodiments, some or all of the data contained in the selected data file may also be displayed in information display area 126e. For instance, in the embodiment depicted in FIG. 6, the data file selected in text entry box 124l is displayed in the information display area 126g and data contained in the selected data file is partially displayed as a graph in information display area 126e. It is contemplated that, in some embodiments, the information display region 126f may list all the data files available for the selected road 196 in addition to, or in lieu of, data files that match the selected criteria. It is also contemplated that in some embodiments, data files for different selected road segments may be attached to the respective segments. After data is attached to the selected road 196, clicking the "OK" button 116t may return the user to the first window 110.

After a road maintenance project is created and defined using the windows of the first group (first window 110, second window 130, third window 150, and the fourth window 170), one of the buttons of the button region 116 may be clicked to access a window of a different group. For instance, the "Tools" button 116c in the button region 116 may be clicked to access one of more windows for data analysis. In some embodiments, clicking the "Tools" button 116c may allow the user to select one of multiple data analysis windows. These data analysis windows may allow the user to perform different kinds of data analysis. Non-limiting examples of data analyses that may be included are condition monitoring, preventive maintenance, planning and scheduling, and performance metrics.

Figure 7:
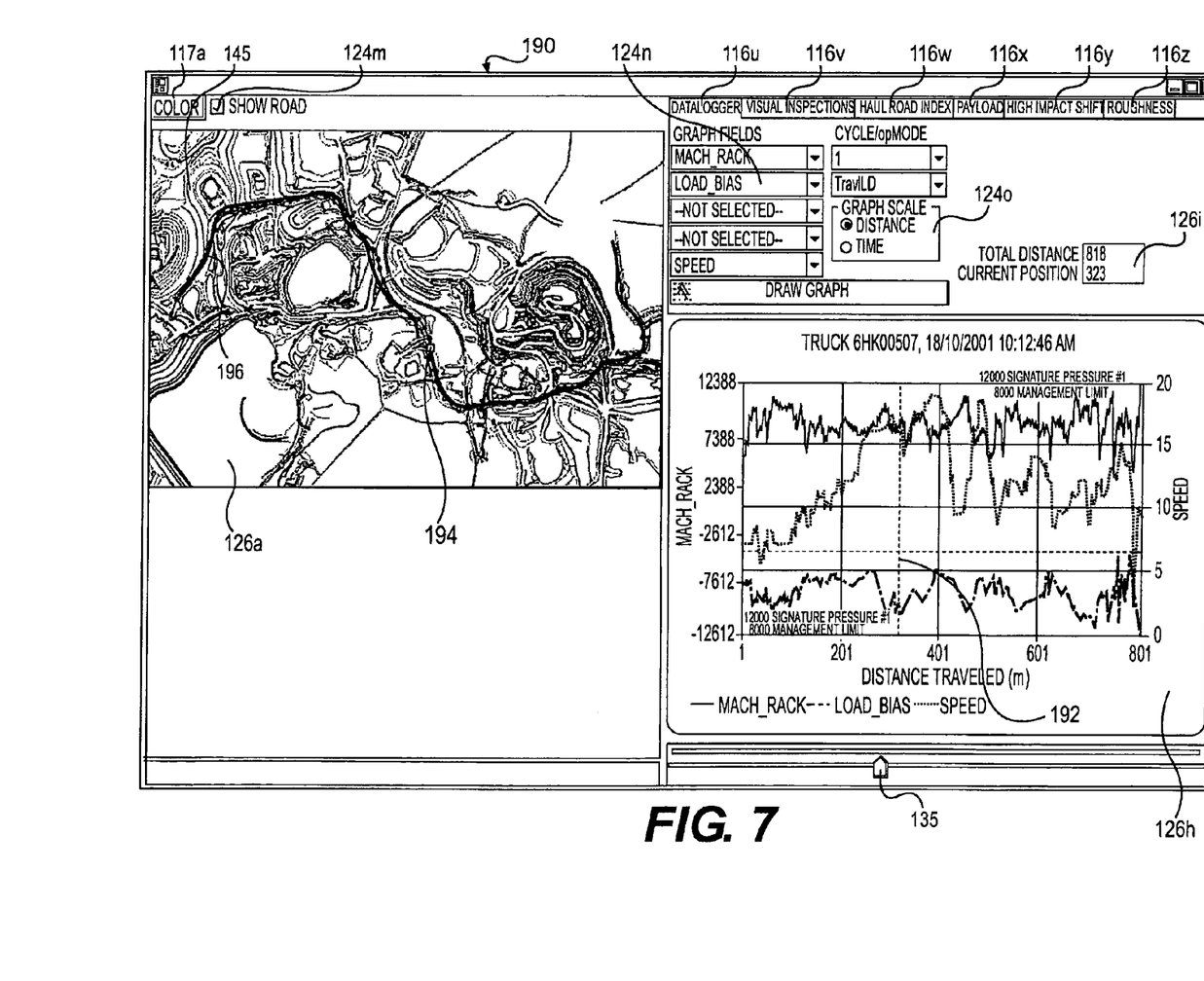
FIG. 7 is a schematic illustration of an exemplary fifth window of the GUI for use with the display device of FIG. 2.

Condition monitoring may include windows that analyze the monitored, observed and computed data of the selected road 196 and display a summary of a road condition. Invoking condition monitoring (clicking on "condition monitoring") may invoke a fifth window 190. FIG. 7 shows an embodiment of the fifth window 190. The fifth window 190 may also include multiple buttons 116u-z, text entry boxes 124m-n, and multiple information display areas 126a, 126h. The multiple buttons 116u-z may activate windows that may each perform a different analysis. The multiple buttons may include, among others, a datalogger button 116u, a visual inspections button 116v, a haul road index button 116w, a payload button 116x, a high impact shift button 116y, and a roughness button 116z.

The "Datalogger" button 116u may allow a user to display any monitored and/or computed data. Text entry boxes 124n may allow a user to select one or more of the available data in a selected data file. In some cases, clicking on a box adjoining text entry boxes 124n may allow the user to select from among the available data. The data selected using text entry boxes 124n may be displayed in any format in information display area 126h. In some embodiments, the selected data may be graphically displayed in information display area 126h. For instance, if suspension cylinder pressures FL, FR, and computed quantity machine rack are selected using text entry boxes 124n, the graphical display in information display area 126h may indicate a undesired variation of the data. Undesired variations of data may be regions of the graph where the data indicates a large variation. In some embodiments, preset limits of variation may establish undesired variations of data. For instance, amplitude values higher or lower than a predetermined range of amplitude values may indicate an undesired variation of data. The user may also select the type of graphical display using text entry boxes 124o. For instance, appropriate selections in text entry box 124o may display the selected data as a function of time or distance. If distance graphical display is chosen in information display box 124o, the x-axis of the graph in information display area 126h may indicate a distance along the selected road 196 (from one of the end points) and the y-axis may indicate the amplitude of the displayed data. If a time graphical display is chosen, the graphical display in the information display area 126h may indicate a time variation of the selected data.

In some embodiments, the map of the mine road is also displayed in information display area 126a of the fifth window 190. Checking a "Show Road" text entry box 124m may enable the user to display the selected road 196 on the mine road maintenance map 145 in information display area 126a. In some embodiments, a "Color" tab 117a may also enable the user to change the color of the selected road 196 in the displayed mine road maintenance map 145. In some embodiments, a cursor 192 on the graphical data display in information display area 126h may indicate a corresponding point 194 on the mine road maintenance map 145 in information display area 126h. That is, data at the location of cursor 192 may correspond to the location of corresponding point 194 on the map. If the location of the cursor 192 on the graphical display is changed, the location of the corresponding point 194 may change to indicate the new location. The location of the cursor 192 on the graphical display may be changed by sliding slider 135. Sliding slider 135 to the right may move the cursor 192 to the right, and sliding cursor 192 to the left may move the cursor to the left. It is contemplated that other methods, such as a mouse or another input module 72, may also be used to move the cursor 192. It is also contemplated that the corresponding point 194 may be moved in the mine road maintenance map 145 to automatically update the location of the cursor 192 in the graphical display. In some embodiments, information display area 126i may display information relating to the graphical display. For instance, the total distance displayed of the graphical display and the distance of the cursor 192 position may be displayed in information display area 126i.

The "Visual inspections" button 116v may invoke a window (not shown) that displays observed data. In some embodiments, the window may include a mine road maintenance map 145 along with a display of the reported observed road condition data. In some embodiments, a cursor may be moved along the selected road 196 in the mine road maintenance map 145. As the cursor moves, the observed data at the cursor location may be displayed. In some embodiments, pictures of the defect corresponding to the observed data may also be displayed. In some embodiments, the user may input additional observed data using text entry boxes in the window. The window may also include other tabs that control features of the display. It is also contemplated that, in some embodiments, the user may overlay the observed data on a graph (or other display) of the monitored data. In these embodiments, the user may identify the impact of an observed defect on the monitored data. In some embodiments, a cursor 192 may be moved (as described earlier with reference to FIG. 7) on the graph to identify the location of the defect on the mine road maintenance map 145.

The "Haul road index" button 116w may invoke one or more windows (not shown) that may display a criticality factor. In some embodiments, the haul road index tab may also be named the TKPH tab (Tonnes Kilometers Per Hour). The criticality factor may include some measure of the road condition. In some embodiments, the criticality of the road condition may be indicated on a relative scale between 1 and 10, with 1 indicating a good road condition, and 10 indicating a poor road condition. The criticality factor may be a determined as a function of at least some of the data. Any algorithm may be used to determine the criticality factor. In some embodiments, the number of times a monitored and/or a computed data exceeds a preset limit may factor into the calculation of the criticality factor. The haul road index window may also include multiple tabs, text entry boxes, and information display region. The tabs may provide access to other windows, and the text entry boxes may allow the displays of the windows to be modified.

Figure 8:
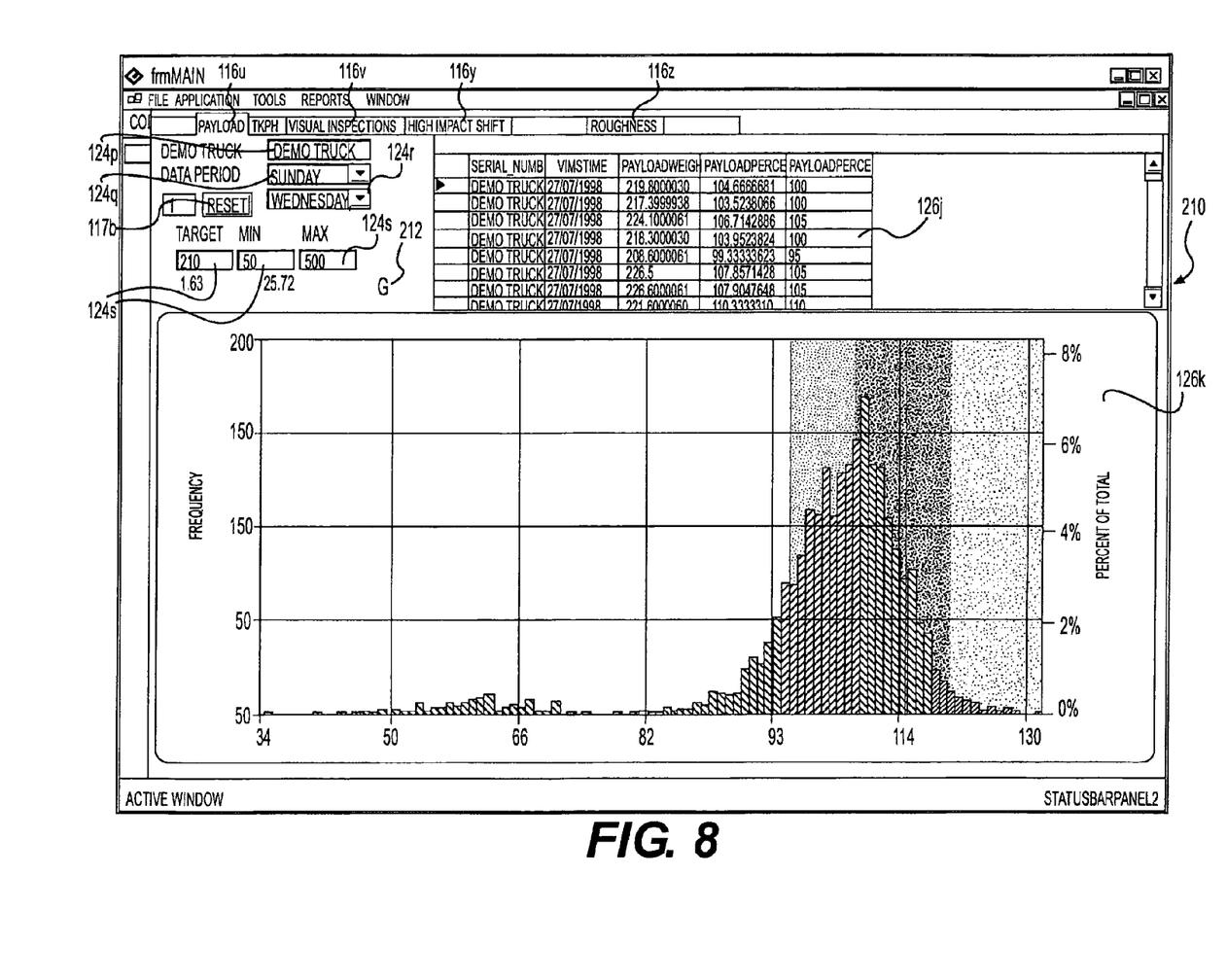
FIG. 8 is a schematic illustration of an exemplary sixth window of the GUI for use with the display device of FIG. 2.

The "Payload" button 116x may invoke a sixth window 210. The sixth window 210 may display a payload distribution analysis. FIG. 8 shows an exemplary sixth window 210. The sixth window 210 may also include multiple buttons 116u-z and 117b, text entry boxes 124p-s, and one or more information display regions 126j-k. The multiple buttons 116u-z may include visual inspections button 116v, TKPH tab (haul road index button 116w), payload button 116x, high impact shift button 116y, and roughness button 116z. In some embodiments, a user may select the payload data for analysis by specifying the data in text entry box 124p. In other embodiments, other identifiers (for instance, vehicle type, vehicles on the selected road, etc. In some embodiments, the payload data may be selected from a listing of available payload data in information display area 126j. In these embodiments, selection of a desired payload data from the list displayed in the information display area 126j may populate the text entry box 124p with an identifier related to the selected payload data. The "Reset" tab 117b may allow a user to disregard previously selected payload data and reselect a desired payload data. In some embodiments, the listing of payload data in the information display area 126j may be limited by specifying limits in text entry boxes 124q-r. For instance, by specifying a starting date on text entry box 124q and an ending date on text entry box 124r, the payload data listed in the information display area 126j may be selected to be the payload data between these specified dates. It is contemplated that other methods may be used to limit the listing in the information display area 126j and to select the payload data.

Information display area 126k may display a histogram of the selected payload data. The histogram may indicate the number of times the weight of the payload of a haul truck 20 exceeds a target value. Text entry boxes 124r may allow the user to specify the target value and the minimum values to be displayed in the histogram. In some embodiments, the number of times the payload weight of haul trucks exceeded the target value by different amounts may be highlighted (for instance, the number of times the payload weight was between 100% to 110%, 110% to 120%, and exceeded 120%).

In some embodiments, the control system 70 may compute an overall payload rating 212 based on the payload distribution analysis. Although the overall payload rating 212 may be determined in any manner, some embodiments determine the overall payload rating 212 based on the 10-10-20 rule. The 10-10-20 rule, in general, states that the payload weight may fall within 100% to 110% of the target value 90% of the time, 110 to 120% of the target value 10% of the time, and never exceed 120% of the target value. The overall payload rating 212 may indicate the overall effectiveness of payload management in a mine road 10. Some embodiments display the overall payload rating 212 using a relative scale. For instance, the relative scale may vary from A through J with A indicating an effective payload management and J indicating poor payload management.

The "High Impact Shift" button 116y may invoke one or more windows (not shown) that indicates when a high impact shifting event occurred. A high impact shifting event may be defined as an occurrence of a down shift of a gear (for instance, from the $5^{th}$ gear to the $4^{th}$ gear, the $4^{th}$ gear to the $3^{rd}$ gear, etc.) when the engine load (power) is above a preset value. The preset value of engine load (above which a high impact shifting event may be recorded) may be input by the user using a text entry box, or may default to a predetermined value. High impact shifting may adversely affect drive-train components (for instance, the transmission) of the haul truck 20. In some embodiments, a window may tabulate each occurrence of a high impacting shifting event along with other details. These details may include, among others, the location (on the mine road) of the shifting event, truck number, date, and time of the occurrence. In some embodiments, a map of the mine road along with means to correlate a high impact shift to a location on the mine road maintenance map 145, may also be included in the window. For instance, in some embodiments, selecting a high impact shifting event from the displayed table may highlight the location of its occurrence on the map. In some embodiments, the high impact shift data may be overlaid with other monitored and observed data to correlate the location of a high impact shift to a road defect.

The "Roughness" button 116z may invoke one or more windows (not shown) that may display a roughness of the selected road segment. Roughness may be a measure of the irregularities of the road surface, and may be an indicator of operator comfort and road quality. In some embodiments, roughness may be part of the data monitored by haul truck 20 or service truck 40. In some other embodiments, roughness may be computed using the monitored data. In some embodiments, the average value of the two front suspension cylinder pressures (FL and FR) may be used as a measure of the road roughness. A graph with this average pressure on the y-axis and the distance along the road in the x-axis may be displayed to graphically depict the road roughness. In some embodiments, a roughness factor may be computed based on the computed roughness. The roughness factor may indicate a measure of the overall roughness of the road surface. In some embodiments, a movable cursor (as described earlier) may allow correlation of a location on the graph to the location on a mine road maintenance map 145.

Selecting "Preventive maintenance" analysis from the "Tools" button 116c in the button region 116 may activate a preventive maintenance window (not shown). The preventive maintenance window may include one or more windows that allow the user to use the data to prioritize and schedule mine road maintenance. In some embodiments, the control system 70 may use the data to recommend a list of road repairs. In some embodiments, these recommendations may be based on the road condition data of different road sections and other mine road related information. These other mine road related information may include, among others, frequency of road use, availability of alternate roads, knowledge of anticipated changes in the mine operation, etc. For instance, in some embodiments, in addition to road condition data, the data may include information on payload traffic, vehicle traffic, road segment usage, etc. The user may also input known future information relating to the mine operation to the control system 70 (using a window of the GUI). In these embodiments, the control system 70 may incorporate this forecast data into the analysis when providing recommendations. For example, a forecasted increase in use of excavation site 15 and decrease in use of excavation site 45 may increase the importance of a particular road segment over another. This information may be used by control system 70 to prioritize repairs to some road segments over others. The recommended list of road repairs may be displayed in a graphical, textual, or a combined (including both graphical and textual displays) format.

Selecting "Planning and scheduling" analysis from the "Tools" button 116c may activate the planning and scheduling window (not shown). The planning and scheduling window may include one or more windows that enable a user to plan and schedule maintenance of the mine road 10 or a mine road segment. In some embodiments, scheduling of the maintenance may be based on the recommended list of road repairs. In some embodiments, the control system 70 may automatically schedule the maintenance event. That is, the maintenance event may be scheduled in the time management calendars of repair personnel and equipment. In some embodiments, a previously planned and scheduled road maintenance may be rescheduled based on new priorities.

Selecting "Performance monitoring" analysis from the "Tools" button 116c may activate a performance monitoring window (not shown). The performance monitoring window may include one or more windows that allow a user to compute performance metrics. In some embodiments, these performance metrics may include, among others, mean time between failures, mean time to repair, road defect-free index, the cost per kilometer of haul vehicle operation, cost per square meter of road maintenance, age of the reported defects, traffic volumes over road segments, rolling resistance and roughness levels of road segments, etc. These performance metrics may indicate the effectiveness of the road maintenance system. For example, an increased mean time between failures, decreased mean time to repair, and decreased cost per kilometer of vehicle operation all may indicate a robust road maintenance system.

After the data analysis is completed, one or more reports may be generated using the report windows of the third group (not shown). These report windows may be activated by clicking on the "Report" button 116d in the button region 116. The report windows may include one or more windows that may enable a user to create reports. The reports may include a summary of the data analysis, and/or the raw data. In some embodiments, the reports may also include the recommended list of road repairs and the computed performance metrics. The user may also input text in text entry boxes associated with the report windows. The reports may be generated in any format that may be understood by the user. In some embodiments, the reports may also include comparisons of current road maintenance data with historical road maintenance data.

INDUSTRIAL APPLICABILITY

The disclosed system may provide an efficient method for managing road maintenance. In particular, the disclosed control system for road maintenance management with a GUI may improve the effectiveness of road maintenance management by providing an intuitive visual display of data relating to road and vehicle conditions. The control system may be equipped with software and hardware to acquire, store and analyze mine road and haul truck data. The control system may analyze the data to determine the impact of road defects on the haul truck and on the overall efficiency of the mine. The control system may also determine a recommended list of road repairs, and automatically schedule a recommended road repair event.

The control system may also include a GUI to display the road and vehicle data to a user. Visualizing the data and comparing the data to observed road defects may allow a user to easily grasp the effect of a road defect on vehicles. The intuitiveness of the GUI layout may allow a user to easily navigate through the GUI to view different kinds of data and understand the impact of a road defect on the vehicles. The GUI may also enable the user to perform analysis on the data and to schedule road maintenance events.

To illustrate an application of road maintenance management with the GUI, an exemplary embodiment will now be described. A user switches on the control system 70 and initiates a software to perform maintenance management of a mine road. Initiation of the software opens the first window 110. The user enters a name and a brief description of the project, and click on the "Map" tab 120b to select a mine road maintenance map 145 for analysis. Clicking on the "Map" tab 120b opens the second window 130. The user enters the memory location of a desired map ("EXAMPLE1.JPG") in the text entry box 124d as "C:\EXAMPLE\EXAMPLE1.JPG." The user clicks the "OK" button 116g to display the map named "EXAMPLE1.JPG" on the information display area 126a. A brief description of the "EXAMPLE1.JPG" map will also be displayed in text entry box 124e. The display of the map and the brief description will help the user identify the desired map.

Once the desired map is chosen, the user then identifies a road in the desired map for analysis. To identify the road, the user clicks the "Next" button 116h to open the third window 150. The user clicks the "Draw Road" button 116j in the third window 150 to input locations of multiple waypoints that define the road. To input the location of a waypoint, the user selects a point on the "EXAMPLE1.JPG" map using a mouse. In this manner, the user selects multiple waypoints that will together define the road. After the multiple waypoints are selected, the user clicks the "OK" button 116p to return to the first window 110.

Once the road for analysis is chosen, the user selects a data file containing data related to the road. The user clicks the "Truck" tab 120d to open the fourth window 170. To locate a data file that was stored in memory 78 within the past 7 days, the user enters 7 in the text entry box 124k and clicks the "Scan" button 116s. The first data file displayed in the information display area 126f is chosen by clicking the text entry boxes 124l corresponding to the first data file, and clicking the "Add Truck" button 116r. Other data files may also be chosen in a similar manner. The chosen data files will be displayed in the information display area 126g. To view the contents of a data file, the user may highlight the data file in the information display area 126g. The data contained in the highlighted data file will be graphed in information display area 126e. The user may now click the "OK" tab of the fourth window 170 to open the first window 110.

After selecting a data file associated with the road, the user analyzes the data. The user selects "Condition monitoring" from the "Tools" button 116c to analyze the data. Selecting "Condition monitoring" opens the fifth window 190. In the fifth window 190, the user clicks the "Datalogger" button 116u to view the data and identify locations of road damage. The locations of road damage may correspond to locations of undesired variations in data. The user can choose to view a desired data in the data file using text entry boxes 124n. The user enters "Machine Rack" in the text entry box 124n to view a graph of the machine rack data in the information display area 126h. The graphical display indicates variation of machine rack as a function of distance along the road. The graph also indicates the preset limits of machine rack data at +8000 and −8000. Machine rack data higher than +8000 and lower than −8000 indicates a location of road damage. The user moves the cursor 192 to a location where the machine rack data is outside the preset range (+8000 to −8000), and the corresponding point 194 on the "EXAMPLE1.JPG" map moves automatically to identify the corresponding location on the road. The user can now decide whether or not to rectify the road defect based on the variation of the machine rack data beyond the preset range.

It will be apparent to those skilled in the art that various modifications and variations can be made in the disclosed process and system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A mine road maintenance management system, comprising:
 a control system configured to receive data related to the mine road, the data including one of performance data associated with a vehicle traveling on the mine road, and road condition data associated with quality of the mine road, the control system including;
- a storage device configured to store the data; and
- a display device configured to display a graphical user interface with a first window, the first window configured to include;
  - a graph of the data;
  - a map of the mine road including a selected road, the graph displaying a variation of the data along the selected road; and
  - a cursor configured to move over the graph and a pointer configured to identify an area of the selected road corresponding to a current location of the cursor on the graph.

2. The mine road maintenance management system of claim 1, wherein the first window includes one or more links configured to facilitate access of a second window and a third window, the second window being configured to input the data, and the third window being configured to input the map.

3. The mine road maintenance management system of claim 2, wherein the map is input by selecting a map from a plurality of maps stored in memory.

4. The mine road maintenance management system of claim 2, wherein data is input by selecting a data file from a display of a list of multiple data files.

5. The mine road maintenance management system of claim 1, wherein the first window is configured to graph the data as a function of time and as a function of distance.

6. The mine road maintenance management system of claim 1, wherein the graphical user interface is configured to display an image of a road defect at a selected location on the map.

7. The mine road maintenance management system of claim 1, wherein the selected road is selected by a user choosing multiple waypoints on the map.

8. The mine road maintenance management system of claim 1, wherein the graphical user interface is configured to enable analysis of payload weight of vehicles traveling on the selected road.

9. A maintenance management system for a mine road network, comprising:
- a communication device configured to receive data related to a surface condition of one or more roads of the mine road network;
- a storage device configured to store one or more data files including at least the received data; and
- a display device adapted to display a graphical user interface, the graphical user interface being configured to display a map of the mine road network, facilitate selection a data file of the one or more data files, and enable planning of a repair of one or more roads of the mine road network.

10. The maintenance management system of claim 9, wherein the graphical user interface is further configured to enable the selection of a selected road of the one or more roads of the mine road network.

11. The maintenance management system of claim 10, wherein the graphical user interface is configured to enable the selection of the selected road by clicking on an image of the selected road on the map of the mine road network.

12. The maintenance management system of claim 10, wherein the graphical user interface is further configured to display an image of a road surface condition associated with a selected point on the selected road.

13. The maintenance management system of claim 9, wherein the graphical user interface is further configured to display a recommended list of road repairs based on at least a current surface condition of the one or more roads of the mine road network and information related to a usage of the one or more roads.

14. The maintenance management system of claim 9, wherein the graphical user interface is further configured to schedule the repair of at least one road of the one or more roads.

15. The maintenance management system of claim 9, wherein the graphical user interface is further configured to calculate performance metrics associated with the maintenance management system, the performance metrics being indicative of an effectiveness of the maintenance management system.

16. A maintenance management system for a mine road network, comprising:
- a storage device configured to store data related to a surface condition of one or more roads of the mine road network; and
- a display device adapted to display a graphical user interface, the graphical user interface being configured to:
  - enable the selection of a map of the mine road network from a plurality of available maps;
  - display the selected map;
  - select a selected road from the displayed map;
  - analyze the data associated with the selected road; and
  - enable planning of a repair of one or more roads of the selected mine road network.

17. The maintenance management system of claim 16, wherein the graphical user interface is further configured to display a recommended list of road repairs based on at least a current surface condition of the one or more roads of the mine road network and information related to a usage of the one or more roads.

18. The maintenance management system of claim 16, wherein the graphical user interface is further configured to enable analysis of payload weights of vehicles traveling on the one or more roads of the mine road network.

19. The maintenance management system of claim 18, wherein the graphical user interface is further configured to configured to display a graph indicating the number of times the payload weight exceeded a target payload weight.

20. The maintenance management system of claim 16, wherein the graphical user interface is further configured to display an image of a road defect at a selected location of the selected road.

* * * * *